US012676025B2

(12) United States Patent
Chen

(10) Patent No.: US 12,676,025 B2
(45) Date of Patent: Jul. 7, 2026

(54) SYSTEM AND METHOD FOR USING SENSORS AND SENSOR DATA TO EVALUATE DANCE PERFORMANCE

(71) Applicant: Marilyn S. Chen, Belle Mead, NJ (US)

(72) Inventor: Marilyn S. Chen, Belle Mead, NJ (US)

( * ) Notice: Subject to any disclaimer, the term of this patent is extended or adjusted under 35 U.S.C. 154(b) by 221 days.

(21) Appl. No.: 18/778,974

(22) Filed: Jul. 20, 2024

(65) Prior Publication Data
US 2026/0024376 A1    Jan. 22, 2026

(51) Int. Cl.
*G06V 40/20*        (2022.01)
*G06V 40/16*        (2022.01)

(52) U.S. Cl.
CPC ........... *G06V 40/23* (2022.01); *G06V 40/174* (2022.01)

(58) Field of Classification Search
CPC ....... G06V 20/46; G06V 40/174; G06V 40/23
USPC ........................................................ 382/103
See application file for complete search history.

(56) References Cited

U.S. PATENT DOCUMENTS

2022/0358310 A1* 11/2022 Lin ....................... G06N 3/0464
2023/0260326 A1*  8/2023 Zhou ...................... G06V 40/23
                                                              382/103

FOREIGN PATENT DOCUMENTS

CN        118553005 A  *  8/2024 ............. G06V 20/41
CN        120129926 A  *  6/2025 ........... G06T 13/205
KR       20250046443 A  *  4/2025 ......... A63B 24/0006

* cited by examiner

*Primary Examiner* — Behrooz M Senfi
(74) *Attorney, Agent, or Firm* — Zhong Law, LLC

(57) ABSTRACT

A dance performance may be evaluated by comparing video and audio of the performance to dance evaluation data in order to assess scores for: technical proficiency based on a quality of each dance move in the performance; artistic expression based on a quality of a dancer's facial expressions, body language, and gestures; musicality and rhythm based on a comparison of dance moves in the video to sounds in the corresponding audio; and choreography based on a quality of a storytelling, emotional expression, and visual impact of the performance. A costume and set design score may be assessed based on a quality of style, creativity and uniqueness of the costumes and sets of the performance; and an individual style score may be assessed based on a quality of a dancer's individuality. A total score for the performance may be calculated based on the assessed scores and the scores may be displayed.

20 Claims, 8 Drawing Sheets

Figure 6:
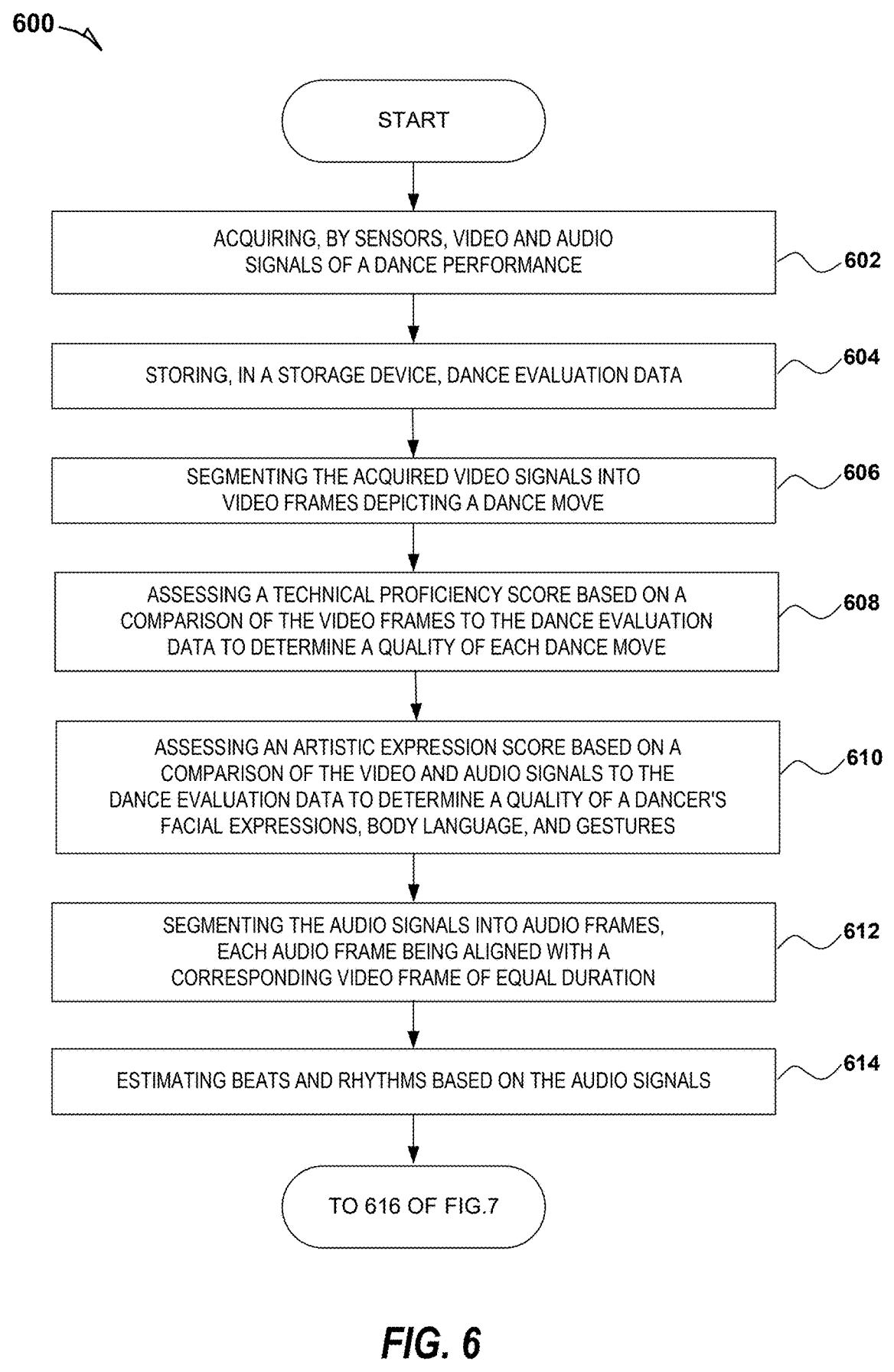

600

START

ACQUIRING, BY SENSORS, VIDEO AND AUDIO
SIGNALS OF A DANCE PERFORMANCE     602

STORING, IN A STORAGE DEVICE, DANCE EVALUATION DATA     604

SEGMENTING THE ACQUIRED VIDEO SIGNALS INTO
VIDEO FRAMES DEPICTING A DANCE MOVE     606

ASSESSING A TECHNICAL PROFICIENCY SCORE BASED ON A
COMPARISON OF THE VIDEO FRAMES TO THE DANCE EVALUATION
DATA TO DETERMINE A QUALITY OF EACH DANCE MOVE     608

ASSESSING AN ARTISTIC EXPRESSION SCORE BASED ON A
COMPARISON OF THE VIDEO AND AUDIO SIGNALS TO THE
DANCE EVALUATION DATA TO DETERMINE A QUALITY OF A DANCER'S
FACIAL EXPRESSIONS, BODY LANGUAGE, AND GESTURES     610

SEGMENTING THE AUDIO SIGNALS INTO AUDIO FRAMES,
EACH AUDIO FRAME BEING ALIGNED WITH A
CORRESPONDING VIDEO FRAME OF EQUAL DURATION     612

ESTIMATING BEATS AND RHYTHMS BASED ON THE AUDIO SIGNALS     614

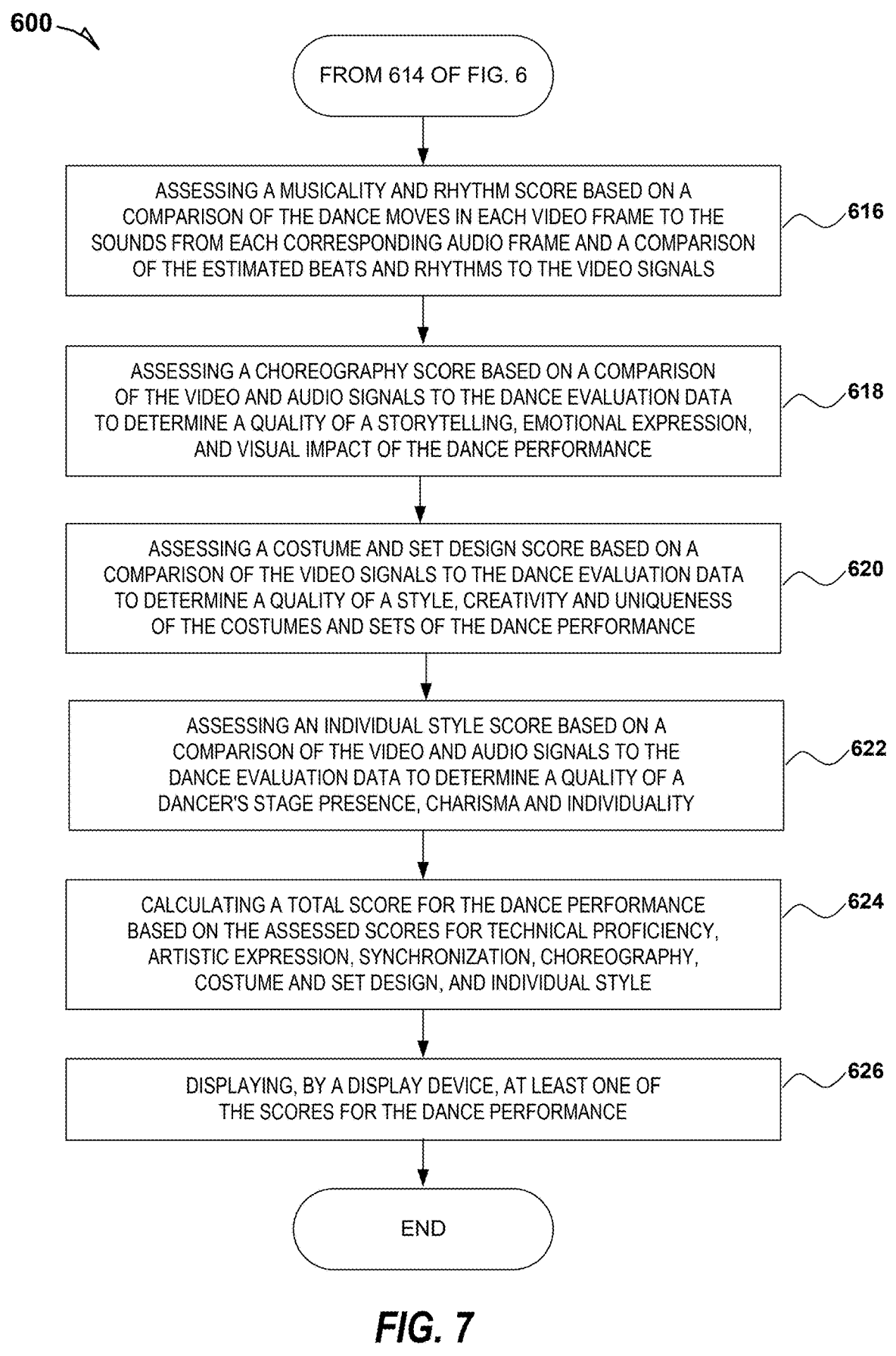

```
┌─────────────────────────────┐
│      FROM 614 OF FIG. 6      │
└─────────────────────────────┘
```

```
┌─────────────────────────────────────────────────────┐
│  ASSESSING A MUSICALITY AND RHYTHM SCORE BASED ON A   │
│  COMPARISON OF THE DANCE MOVES IN EACH VIDEO FRAME TO THE │   616
│  SOUNDS FROM EACH CORRESPONDING AUDIO FRAME AND A COMPARISON │
│  OF THE ESTIMATED BEATS AND RHYTHMS TO THE VIDEO SIGNALS │
└─────────────────────────────────────────────────────┘
```

```
┌─────────────────────────────────────────────────────┐
│  ASSESSING A CHOREOGRAPHY SCORE BASED ON A COMPARISON │
│  OF THE VIDEO AND AUDIO SIGNALS TO THE DANCE EVALUATION DATA │   618
│  TO DETERMINE A QUALITY OF A STORYTELLING, EMOTIONAL EXPRESSION, │
│  AND VISUAL IMPACT OF THE DANCE PERFORMANCE │
└─────────────────────────────────────────────────────┘
```

```
┌─────────────────────────────────────────────────────┐
│  ASSESSING A COSTUME AND SET DESIGN SCORE BASED ON A  │
│  COMPARISON OF THE VIDEO SIGNALS TO THE DANCE EVALUATION DATA │   620
│  TO DETERMINE A QUALITY OF A STYLE, CREATIVITY AND UNIQUENESS │
│  OF THE COSTUMES AND SETS OF THE DANCE PERFORMANCE │
└─────────────────────────────────────────────────────┘
```

```
┌─────────────────────────────────────────────────────┐
│  ASSESSING AN INDIVIDUAL STYLE SCORE BASED ON A       │
│  COMPARISON OF THE VIDEO AND AUDIO SIGNALS TO THE      │   622
│  DANCE EVALUATION DATA TO DETERMINE A QUALITY OF A     │
│  DANCER'S STAGE PRESENCE, CHARISMA AND INDIVIDUALITY   │
└─────────────────────────────────────────────────────┘
```

```
┌─────────────────────────────────────────────────────┐
│  CALCULATING A TOTAL SCORE FOR THE DANCE PERFORMANCE  │
│  BASED ON THE ASSESSED SCORES FOR TECHNICAL PROFICIENCY, │   624
│  ARTISTIC EXPRESSION, SYNCHRONIZATION, CHOREOGRAPHY,   │
│  COSTUME AND SET DESIGN, AND INDIVIDUAL STYLE          │
└─────────────────────────────────────────────────────┘
```

```
┌─────────────────────────────────────────────────────┐
│  DISPLAYING, BY A DISPLAY DEVICE, AT LEAST ONE OF     │   626
│  THE SCORES FOR THE DANCE PERFORMANCE                 │
└─────────────────────────────────────────────────────┘
```

```
┌─────────────┐
│     END     │
└─────────────┘
```

*FIG. 7*

SYSTEM AND METHOD FOR USING SENSORS AND SENSOR DATA TO EVALUATE DANCE PERFORMANCE

TECHNICAL FIELD

The present disclosure relates to a system and method for using sensors and sensor data to evaluate dance performance and more particularly to using artificial intelligence (AI) techniques to evaluate the dance performance based on stored dance evaluation data.

BACKGROUND

Dancing can be a captivating form of personal or group expression. Furthermore, dancing may transcend cultural boundaries and unite people via the universal language of movement. The many different styles of dance, for example, classical styles such as ballet, ethnic styles such as traditional Chinese dance, and more contemporary styles such as hip-hop and jazz, have the ability to convey unique emotions, messages, and stories. In order to better appreciate the art of dance, which is characteristically highly subjective, it would be helpful to systematically and objectively evaluate the quality of individual dance performances. Objectivity, in particular, is essential for the existence of fair and unbiased dance competitions. Dance competitions could be a place where dancers receive valuable feedback to improve themselves as dancers and as artists. However, dance competitions often fail to provide their participants and dancers with a substantial amount of relevant and objective feedback.

Dance evaluation can be a complex and multidimensional process, which may involve observing and evaluating multiple aspects of a dance performance, such as technical skills, artistic expression, musicality, creativity, choreography, costume and set design, individual style, and cultural context. However, the need to consider so many aspects in order to evaluate a dance performance can make such an evaluation an extremely challenging task. As a result, most dance competitions will invite multiple judges to evaluate a dance performance. The opinions and scoring of these judges (whether aggregated or averaged) are often deemed as final and are then used to measure the quality of the dance performance. This widely used approach to dance evaluation is subjective and may create room for a human judge's biases and prejudices to undermine the integrity of dance competitions. Accordingly, more objective dance evaluation methods may be needed to avoid such biases/prejudices and provide more fair dance evaluations.

BRIEF DESCRIPTION OF THE DRAWINGS

The present disclosure is illustrated by way of example, and not by way of limitation, in the figures of the accompanying drawings.

FIGS. 6 and 7 show a flow diagram of a method for evaluating a dance performance, according to implementations of the disclosure.

DETAILED DESCRIPTION

This disclosure describes a system and a method for objectively evaluating a dance performance. This system and/or method may be used by dance judges as a reference to avoid harmful biases and prejudices, by dancers who seek to further themselves in their dance training, and/or by those who seek some objective assistance in order to better subjectively appreciate a dance performance in its entirety.

As noted above, dance competitions often rely on the varying personal viewpoints and opinions of hired dance judges to evaluate a dance performance. This reliance on human judges could compromise the fairness of these dance competitions and therefore the validity of the competitions themselves. Accordingly, an objective system and method for dance evaluation could protect dancers from being subjected to arbitrary scores and unhelpful critiques at their dance competitions and possibly even during their dance training. Such a system/method for evaluating a dance performance should be able to accommodate all of the diverse dance styles and assorted aspects of dance in order to either assist or replace a trained professional judge in the evaluation of a dance performance. Evaluating and judging the quality of a dance performance may involve, but is not limited to, consideration of the aspects described below with respect to assessing scores for the dance performance.

Figure 1:
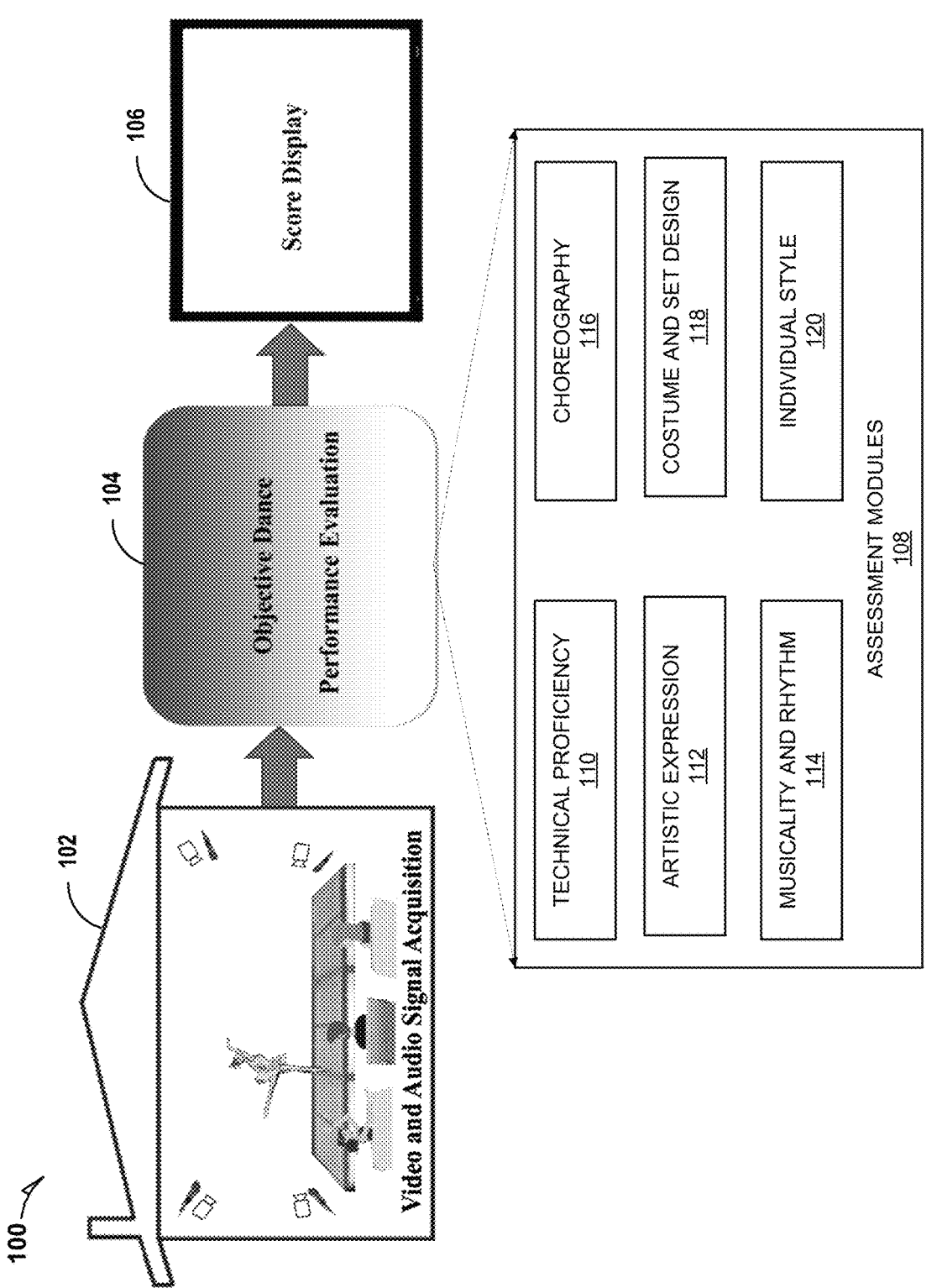
FIG. 1 illustrates an example system for evaluating a dance performance, according to implementations of the present disclosure.

FIG. 1 illustrates an example system 100 for evaluating a dance performance, according to implementations of the present disclosure.

The system 100 may include three major components: a video and audio signal acquisition component 102, an objective dance performance evaluation component 104, and score display component 106. The video and audio signal acquisition component 102 may acquire three-dimensional video signals of the dance performance (e.g., on a stage) and also acquire audio signals (e.g., including musical signals) associated with the dance performance. The objective dance performance evaluation component 104 may take the video and audio signals as its inputs and use artificial intelligence (AI) technologies (e.g., neural networks) to evaluate a dance performance and assess scores for at least one of technical proficiency, artistic expression, musicality, rhythm, synchronization, creativity, choreography, costume and set design, individual style, and cultural context. The score display component 106 (e.g., a display device such as a screen), may display any of the assessed scores (e.g., technical proficiency) as well as an overall score based on the assessed scores.

The video and audio signal acquisition component 102, may include a number of video cameras, which are placed around the stage to acquire the three-dimensional video signals and photos of the dance performance and a number of microphones (e.g., also placed around the stage) to record audio signal comprising the dance music and any other sounds from the stage. The captured multichannel video signal and audio signals may be synchronized and passed to the objective dance performance evaluation component 106.

The objective dance performance evaluation component 104 may include several assessment modules 108 (as described in more detail below) including, but not limited to, technical proficiency assessment 110, artistic expression assessment 112, musicality and rhythm assessment 114, choreography assessment 116, costume and set design assessment 118, and individual style assessment 120.

Figure 2:
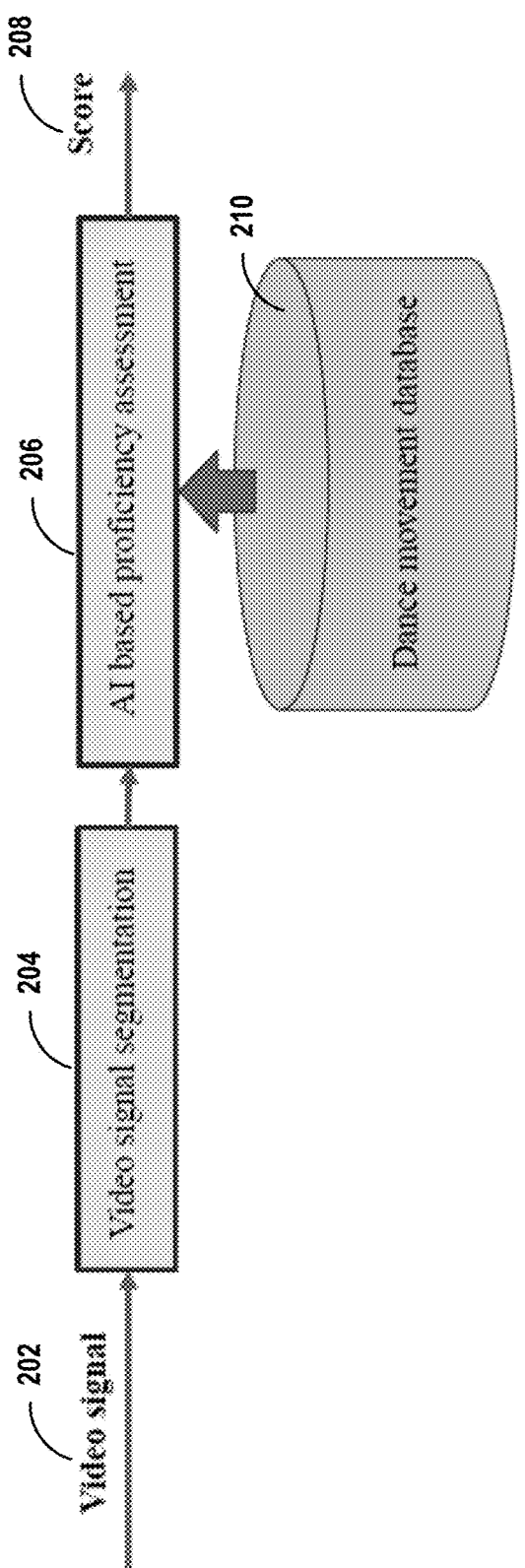
FIG. 2 shows a block diagram of a technical proficiency assessment module, according to implementations of the present disclosure.

FIG. 2 shows a block diagram of a technical proficiency assessment module 110, according to implementations of the present disclosure.

As used herein, technical proficiency may refer to a dancer's demonstrated understanding and execution of technique, ability to effectively utilize rudimentary physical movements, ability to recreate standard body positions, ability to move fluently during transitions between dance moves, clarity of footwork, etc. Accordingly, technical proficiency may be one of the most important aspects to consider for evaluating a dance performance (e.g., a technical proficiency score should be heavily weighted in any calculation of an overall score for a dance performance as described below with respect to FIG. 5).

The technical proficiency assessment module 110, as illustrated in FIG. 2, includes two steps: video signal segmentation 204 and AI based dance move proficiency assessment 206. The video segmentation step 204 segments the input multichannel video signals 202 into synchronous video frames. Each video frame may depict a single dance move or a portion of a single dance move. The segmented video frames may then be passed to the AI based dance move proficiency assessment 206. The AI based moves proficiency assessment 206 takes the segmented video frames and compares the depicted dance moves with those in the dance movement database 210 (e.g., part of a set of stored dance evaluation data) using artificial intelligence technology to decide the quality of every dance move. Finally, a score 208 (e.g., from 0 to 100) may be assessed to reflect the quality of technical proficiency of the dance performance. It should be noted that, although the score may be assessed on a scale of 0 to 100, the maximum and minimum of the score range may also be specified through a user interface. The technical proficiency score may then be projected to the user-specified range.

Furthermore, a dance performance may often occur within a cultural context since many dances are deeply rooted in culture and tradition. Accordingly, any evaluation of a dance performance in a traditional dance style from a specific cultural background a consideration of the cultural context and significance of the dance movements.

However, dance performances are not merely about executing physical movements correctly, they are also a form of artistic expression. As used herein, artistic expression may refer to how clearly and effectively a dancer conveys emotions, themes, or narratives through their movements, facial expressions, body language, and gestures intended to convey the dancer's understanding of the story or message of the dance, as well as the choreographer's original intent.

Similar to the technical proficiency assessment module 110, the artistic expression assessment module 112 takes the acquired multichannel video and audio signals as its input and uses artificial intelligence technology to decide the quality of the artistic expression of a dance performance. For example, based on a comparison of the video and audio signals to stored dance evaluation data (e.g., like the dance movement database 210) to determine a quality of a dancer's facial expressions, body language, and gestures. Finally, a score from 0 to 100 may be assessed to reflect the quality of the artistic expression of the dance performance. As noted above, although the score may be assessed on a scale of 0 to 100, the maximum and minimum of the score range may also be specified through a user interface. The technical proficiency score may then be projected to the user-specified range.

Figure 3:
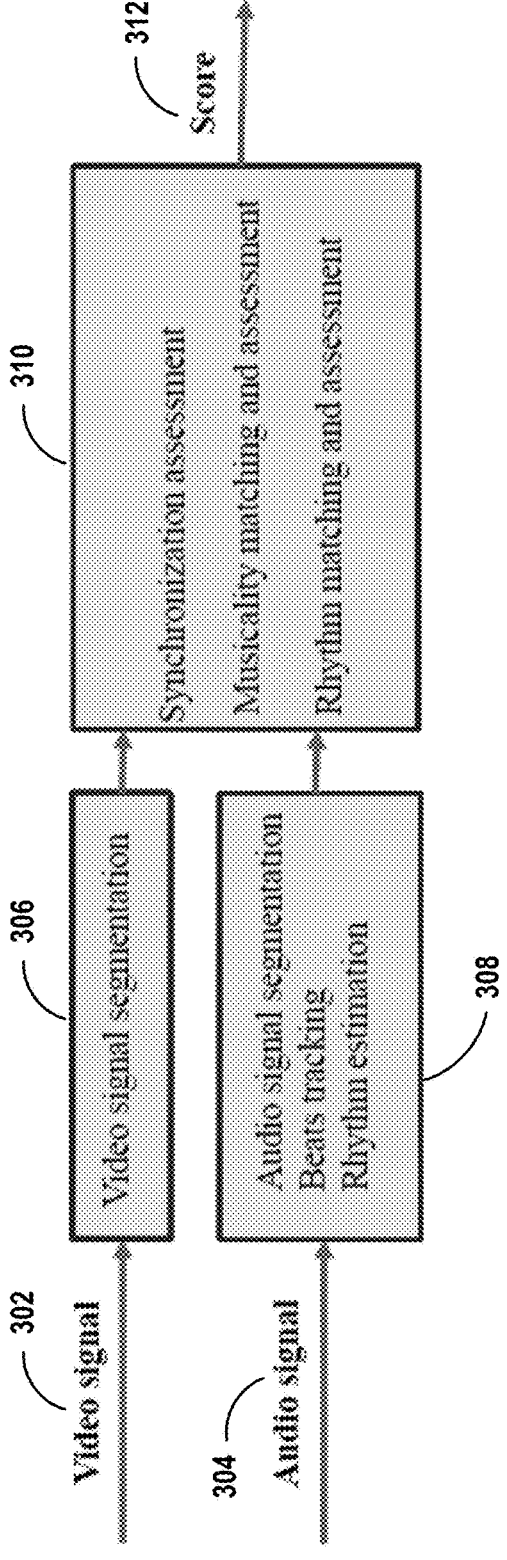
FIG. 3 shows a block diagram of a musicality and rhythm assessment module, according to implementations of the present disclosure.

FIG. 3 shows a block diagram of a musicality and rhythm assessment module 114, according to implementations of the present disclosure.

Musicality, rhythm and synchronization are other aspects of a dance performance that may be assessed in order to evaluate the dance performance. Dance and music often go hand in hand, and are both organized around rhythmic patterns. Accordingly, a dancer's musicality may allow them to identify, connect with, and emphasize the rhythm of their accompanying music in a dance performance. This may be especially true for certain dance styles such as tap dance, flamenco, Irish step dance, and Chinese drum dance, which require dancers to produce percussive sounds, vocalizations, and other extraneous sounds that should either follow the tempo and accentuate the rhythm of the accompanying music, or form a rhythm that emphasizes the dance if there is no accompanying music (e.g., a cappella). Consequently, how well the dancer synchronizes their movements with the music, and the manner in which they interpret the beats and melodies of their music may also be an important aspect for evaluating a dance performance.

Musicality and rhythm (e.g., and synchronization) assessment module 114, as illustrated in FIG. 3, takes the multichannel video signals 302 and audio signals 304 as its inputs. Video signal segmentation step 306 is then used to segment the input multichannel video signals 302 into synchronous video frames. Each video frame may depict a single dance move (or a portion of a single dance move). Similarly, audio signals 304 may be segmented by audio signal segmentation step 308 into audio frames with the duration of each audio frame matching that of a corresponding video frame. The audio signal segmentation step 308 may also include estimations of beats and rhythms based on the audio input signals 304. The segmented video frames and audio frames may then be aligned (e.g., matched) to evaluate the synchronization between the dance moves depicted in each video frame and the sounds (e.g., music) from the corresponding audio frame. The estimated beats and rhythm may also be compared to the video signals to evaluate the musicality and rhythms of the dance performance. Finally, a score 312 from 0 to 100 may be assessed in a synchronization, musicality and rhythm step 310 to reflect the quality of the synchronization, musicality and rhythm of the dance performance. As noted above, although the score may be assessed on a scale of 0 to 100, the maximum and minimum of the score range may also be specified through a user interface. The technical proficiency score may then be projected to the user-specified range.

Figure 4:
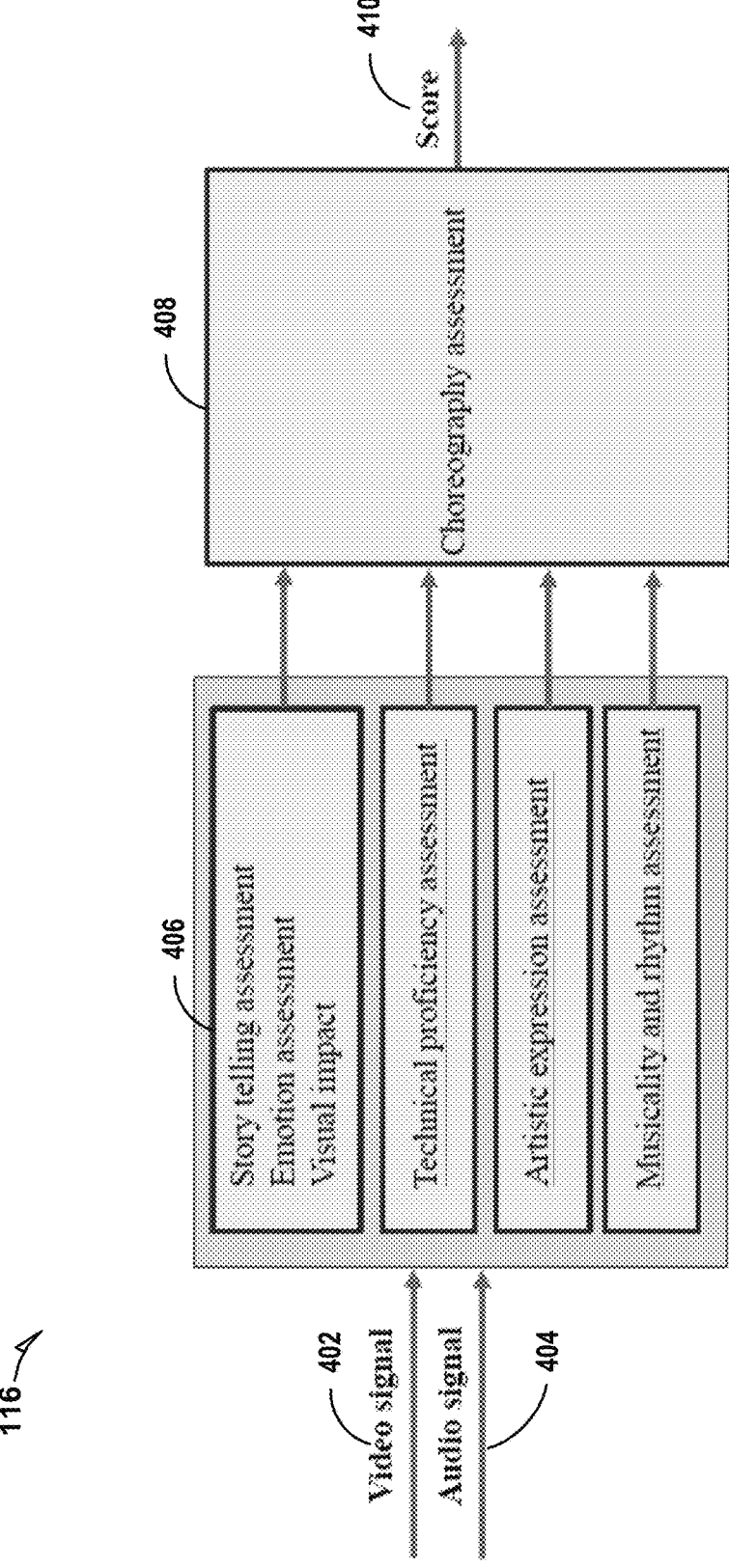
FIG. 4 shows a block diagram of a choreography assessment module, according to implementations of the present disclosure.

FIG. 4 shows a block diagram of a choreography assessment module 116, according to implementations of the present disclosure As used herein, choreography may refer to the arrangement of movements, movement patterns, dancer formations, etc., within a dance. It is the physicalizing of creativity, innovation, and storytelling. A well-choreographed piece will keep the audience engaged and leave a lasting impact on its viewers. After performing a well-choreographed piece, dancers should exit the stage having learned more about themselves, and the audience members should leave the auditorium (e.g., or other venue) having learned more about their community. Therefore, choreography is also an important facet, which should be considered in dance evaluation.

Choreography assessment module 116, as illustrated in FIG. 4, takes the multichannel video signals 402 and audio signals 404 as its inputs. AI based technologies may then be used to assess the story telling, emotional expression and visual impact in step 406. The evaluation results (e.g., as described above) from the technical proficiency, artistic expression, musicality and rhythm assessments may also be considered in choreography assessment step 408 to generate an overall choreography evaluation score 410. As noted above, although the score may be assessed on a scale of 0 to 100, the maximum and minimum of the score range may also be specified through a user interface. The technical proficiency score may then be projected to the user-specified range.

As used herein, costume and set design may refer to the means through which a choreographer and/or dancer can further convey, even significantly enhance, the idea or story behind a dance. Factors that should be considered in the evaluation of the chosen costuming and set design of a dance performance may include how the costume complements the theme or the dance, how the appropriate design of the costume is for the style of dance, how age-appropriate the costuming is, how historically or culturally accurate the costuming is, and/or how the set design contributes to the ambiance and storytelling by creating a visually captivating experience.

Costume and set design assessment module 118 (of FIG. 1) takes the multichannel video signals as its inputs. It evaluates the style of the costume and set design, the matching between the costume and style and story, as well as the uniqueness and creativity of the costume. Finally, a score from 0 to 100 may be assessed to reflect the quality of the costume and set design of the dance performance.

As used herein, individual style may refer to a dancer that is the possession of a unique style, which adds depth and character to the performance and sets the dancer apart from others. This may include stage presence, showmanship, and creative liberties taken by dancers on stage. As a result, acknowledging and appreciating the individuality of the dancer is important, and may be considered in the evaluation process.

Individual style assessment module 120 (of FIG. 1) takes the multichannel video and audio signals as its inputs. It may also include the technical proficiency, musicality and rhythm, and emotion assessment results (as described above) in its evaluation. Artificial intelligence models may be trained to assess a dancer's body language and expression, body mechanics, movement quality, stage presence and charisma, artistic intention, and individuality. Finally, a score from 0 to 100 may be assessed to reflect the quality of the individual style of the dance performance.

Figure 5:
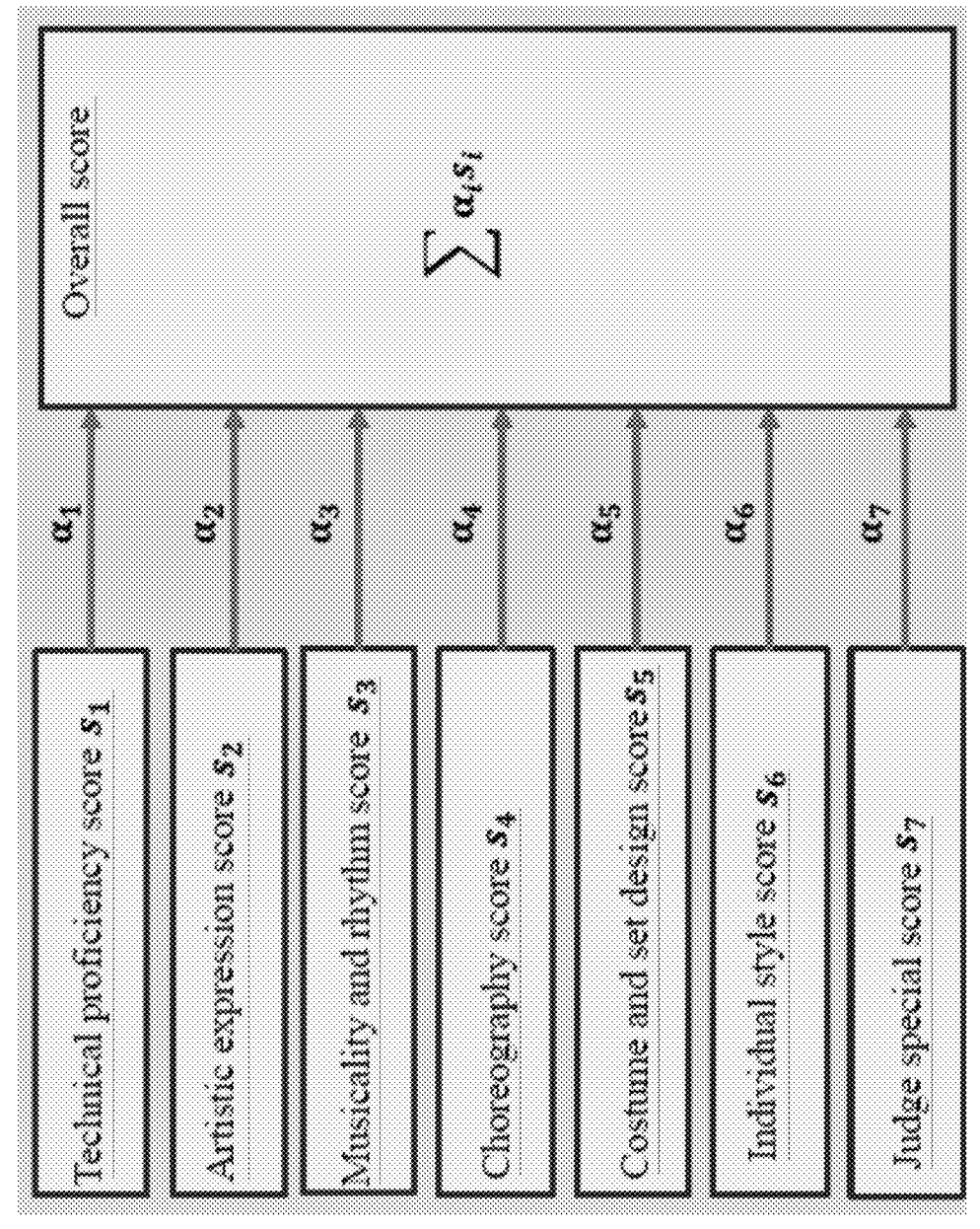
FIG. 5 a block diagram of a calculation of an overall score for the dance performance based on a weighted linear combination of all the assessed scores for the dance performance, according to implementations of the present disclosure.

FIG. 5 a block diagram of a calculation 500 of an overall score for the dance performance based on a weighted linear combination of all the assessed scores for the dance performance, according to implementations of the present disclosure.

The resulting scores $s_1$-$s_6$ from all the dance performance assessment modules 108 of FIG. 1 (e.g., technical proficiency score $s_1$, artistic expression score $s_2$, musicality and rhythm score $s_3$, choreography score $s_4$, costume and set design, score $s_5$ and individual style evaluation score $s_6$) components may be included in the calculation of an overall or total score for a dance performance. In an embodiment, a judge special score $s_7$ from a human judge may also be included in the calculation. The overall score S may be calculated as a weighted linear combination of all the scores $s_i$ from the assessment modules 108, i.e., $$S = \sum_{i=1}^{N} \alpha_i s_i$$

where N is the total number of scores $s_i$ from the assessment modules 108, $\alpha_i$ is the weighting coefficient for the i-th sub-category, which is in the range of 0 and 1, and the sum of all the weighting coefficients (e.g., all of the $\alpha_i$) is 1, i.e., $$\sum_{i=1}^{N} \alpha_i = 1$$

so that the overall score is in the same range as all the individual scores.

FIGS. 6 and 7 show a flow diagram of a method 600 for evaluating a dance performance, according to implementations of the disclosure.

The method 600 may start and may then continue to operation 602, acquiring, by sensors (e.g., video and audio acquisition component 102 of system 100 of FIG. 1), video and audio signals of the dance performance.

At operation 604, storing, in a storage device, dance evaluation data (e.g., dance movement database 210 of FIG. 2).

At operation 606, segmenting the acquired video signals (e.g., video signals 202 of FIG. 2) into video frames depicting a dance move (e.g., in video signal segmentation step 204 of FIG. 2).

At operation 608, assessing a technical proficiency score (e.g., score 208 of FIG. 2) based on a comparison of the video frames to the dance evaluation data to determine a quality of each dance move (e.g., AI based move proficiency assessment 206 of FIG. 2).

At operation 610, assessing an artistic expression score based on a comparison of the video and audio signals to the dance evaluation data to determine a quality of a dancer's facial expressions, body language, and gestures (e.g., by artistic expression assessment module 112 of the assessment modules 108 of FIG. 1).

At operation 612, segmenting the audio signals (e.g., audio signals 304 of FIG. 3) into audio frames, each audio frame being aligned with a corresponding video frame of equal duration (e.g., at audio signal segmentation step 308 of FIG. 3).

At operation 614, estimating beats and rhythms based on the audio signals (e.g., also at audio signal segmentation step 308 of FIG. 3).

At operation 616, assessing a musicality and rhythm score (e.g., score 312 of FIG. 3) based on a comparison of the dance moves in each video frame to the sounds from each corresponding audio frame and a comparison of the estimated beats and rhythms to the video signals (e.g., at synchronization, musicality and rhythm assessment step 310 of FIG. 3).

At operation 618, assessing a choreography score (e.g., score 410 of FIG. 4) based on a comparison of the video and audio signals to the dance evaluation data to determine a quality of a storytelling, emotional expression, and visual impact of the dance performance (e.g., at step 406 and choreography assessment step 408 of FIG. 4).

At operation 620, assessing a costume and set design score based on a comparison of the video signals to the dance evaluation data to determine a quality of a style, creativity and uniqueness of the costumes and sets of the dance performance (e.g., by costume and set design assessment module 118 of the assessment modules 108 of FIG. 1).

At operation 622, assessing an individual style score based on a comparison of the video and audio signals to the dance evaluation data to determine a quality of a dancer's stage presence, charisma and individuality (e.g., by individual style 120 of the assessment modules 108 of FIG. 1).

At operation 624, calculating a total score (e.g., overall score S of FIG. 5) for the dance performance based on the assessed scores for technical proficiency, artistic expression, musicality and rhythm, choreography, costume and set design, and individual style (e.g., technical proficiency score $s_1$, artistic expression score $s_2$, musicality and rhythm score $s_3$, choreography score $s_4$, costume and set design, score $s_5$ and individual style evaluation score $s_6$ of FIG. 5).

At operation 626, displaying, by a display device (e.g., a computer monitor), at least one of the scores for the dance performance (e.g., technical proficiency score $s_1$, artistic expression score $s_2$, musicality and rhythm score $s_3$, choreography score $s_4$, costume and set design, score $s_5$ or individual style evaluation score $s_6$ of FIG. 5 or the overall score S of FIG. 5).

Figure 8:
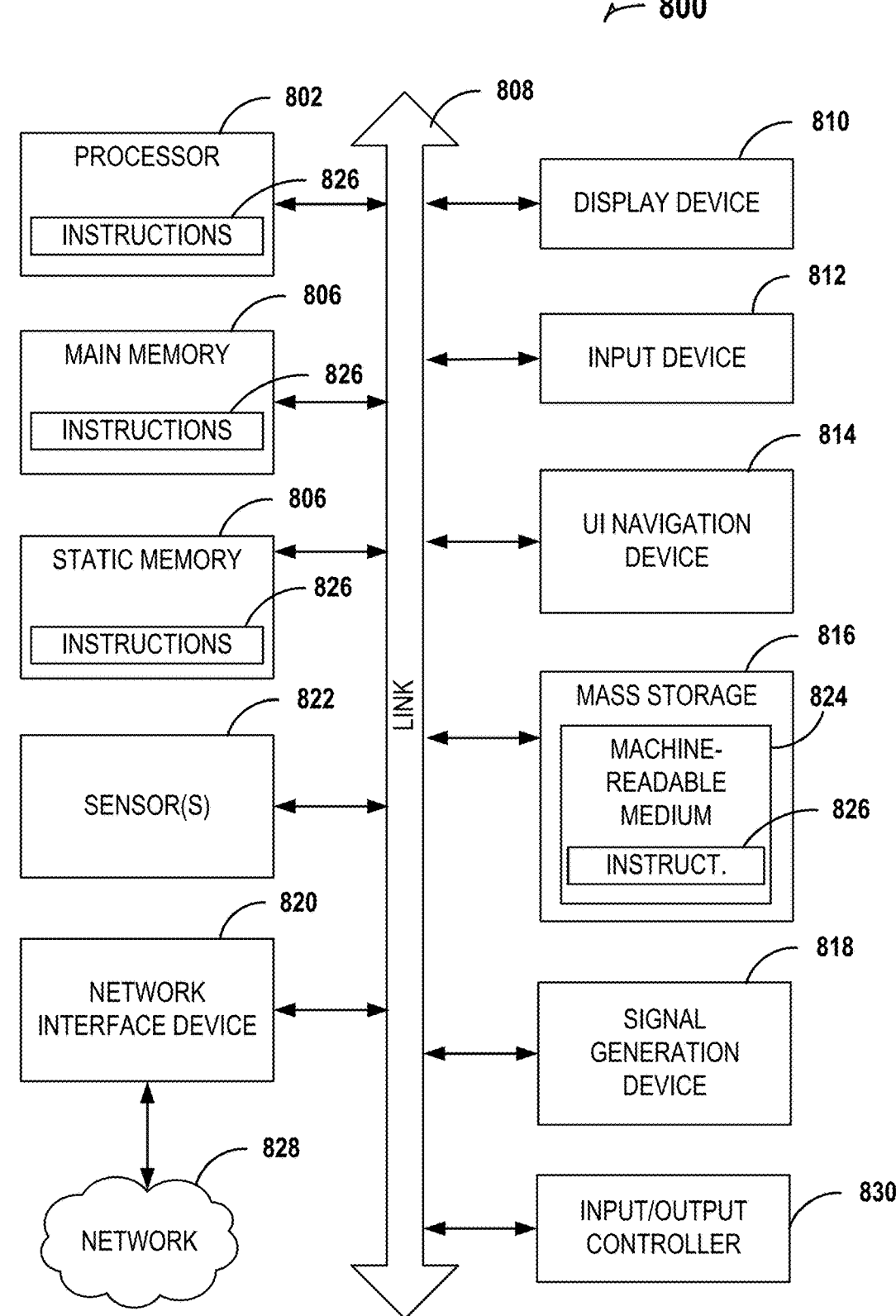
FIG. 8 shows a block diagram illustrating a machine, in the example form of a computer system, within which a set or sequence of instructions may be executed to cause the machine to perform any one of the methodologies discussed herein.

FIG. 8 is a block diagram illustrating a machine in the example form of a computer system 800, within which a set or sequence of instructions may be executed to cause the machine to perform any one of the methodologies discussed herein.

In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein (e.g., method 600 of FIGS. 6 and 7).

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors 822, such as a global positioning system (GPS) sensor, accelerometer, gyrometer, magnetometer, or other such sensor.

The storage device 816 includes a machine-readable medium 824 on which is stored one or more sets of data structures and instructions 826 (e.g., software) embodying or utilized by any one or more of the methodologies or functions described herein. The instructions 826 may also reside, completely or at least partially, within the main memory 804, static memory 806, and/or within the processor 802 during execution thereof by the computer system 800, with main memory 804, static memory 806, and the processor 802 comprising machine-readable media.

While the machine-readable medium 824 is illustrated in an example embodiment to be a single medium, the term "machine-readable medium" may include a single medium or multiple media (e.g., a centralized or distributed database, and/or associated caches and servers) that store the one or more instructions 826. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include volatile or non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 826 may further be transmitted or received over a communications network 828 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 16G LTE/LTE-A or WiMAX networks). The term "transmission medium" shall be taken to include any intangible medium that is capable of storing, encoding, or carrying instructions for execution by the machine, and includes digital or analog signals or other intangible medium to facilitate communication of such software.

Example computer system 800 may also include an input/output controller 830 to receive input and output requests from at least one central processor 802, and then send device-specific control signals to the device they control. The input/output controller 830 may free at least one central processor 802 from having to deal with the details of controlling each separate kind of device.

The term "computer-readable storage medium" used herein may include any tangible medium that is capable of storing or encoding a set of instructions for execution by a computer that cause the computer to perform any one or more of the methods described herein. The term "computer-readable storage medium" used herein may include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

The invention claimed is:

1. A system for evaluating a dance performance, the system comprising:

sensors to acquire video and audio signals of the dance performance;

a storage device to store dance evaluation data;

a processing device, communicatively connected to the sensors and the storage device, to:

segment the acquired video signals into video frames depicting a dance move;

assess a technical proficiency score based on a comparison of the video frames to the dance evaluation data to determine a quality of each dance move;

assess an artistic expression score based on a comparison of the video and audio signals to the dance evaluation data to determine a quality of a dancer's facial expressions, body language, and gestures;

segment the audio signals into audio frames, each audio frame being aligned with a corresponding video frame of equal duration;

estimate beats and rhythms based on the audio signals;

assess a musicality and rhythm score based on a comparison of the dance moves in each video frame to the sounds from each corresponding audio frame and a comparison of the estimated beats and rhythms to the video signals;

assess a choreography score based on a comparison of the video and audio signals to the dance evaluation data to determine a quality of a storytelling, emotional expression, and visual impact of the dance performance;

assess a costume and set design score based on a comparison of the video signals to the dance evaluation data to determine a quality of a style, creativity and uniqueness of the costumes and sets of the dance performance;

assess an individual style score based on a comparison of the video and audio signals to the dance evaluation data to determine a quality of a dancer's stage presence, charisma and individuality; and calculate a total score for the dance performance based on the assessed scores for technical proficiency, artistic expression, musicality and rhythm, choreography, costume and set design, and individual style; and a display device to display at least one of the scores for the dance performance.

2. The system of claim 1, wherein the sensors comprise video cameras positioned to acquire three-dimensional video signals of the dance performance and microphones positioned to acquire corresponding audio signals of the dance performance.

3. The system of claim 1, wherein the dance evaluation data comprises a database of dance moves, dance styles and corresponding musical styles.

4. The system of claim 1, wherein to assess the technical proficiency score based on a comparison of the video frames to the dance evaluation data the processor is further to determine a quality of each transition from a dance move to a next dance move in the dance performance.

5. The system of claim 1, wherein to assess the artistic expression score based on a comparison of the video and audio frames to the dance evaluation data the processor is further to determine how well the dancer conveys emotions, themes, or narratives in the dance performance.

6. The system of claim 1, wherein the processor is further to assess the musicality and rhythm score based on a comparison of percussive sounds or vocalizations produced by a dancer to the video signals and the estimated beats and rhythms.

7. The system of claim 1, wherein the processing device is further to assess at least one of the choreography score or the individual style score based on at least one of: the technical proficiency score, the artistic expression score or the musicality and rhythm score.

8. The system of claim 1, wherein the processor is further to calculate the total score for the dance performance based on an evaluation score from a dance performance judge.

9. The system of claim 1, wherein the assessed scores are in a range from 0 to 100 and the total score is a weighted linear combination of all of the assessed scores.

10. The system of claim 1, wherein the processing device is further to use artificial intelligence (AI) techniques to assess the scores for the dance performance.

11. A method, implemented by one or more processors, for evaluating a dance performance, the method comprising:

acquiring, by sensors, video and audio signals of the dance performance;

storing, in a storage device, dance evaluation data;

segmenting the acquired video signals into video frames depicting a dance move;

assessing a technical proficiency score based on a comparison of the video frames to the dance evaluation data to determine a quality of each dance move;

assessing an artistic expression score based on a comparison of the video and audio signals to the dance evaluation data to determine a quality of a dancer's facial expressions, body language, and gestures;

segmenting the audio signals into audio frames, each audio frame being aligned with a corresponding video frame of equal duration;

estimating beats and rhythms based on the audio signals;

assessing a musicality and rhythm score based on a comparison of the dance moves in each video frame to the sounds from each corresponding audio frame and a comparison of the estimated beats and rhythms to the video signals;

assessing a choreography score based on a comparison of the video and audio signals to the dance evaluation data to determine a quality of a storytelling, emotional expression, and visual impact of the dance performance;

assessing a costume and set design score based on a comparison of the video signals to the dance evaluation data to determine a quality of a style, creativity and uniqueness of the costumes and sets of the dance performance;

assessing an individual style score based on a comparison of the video and audio signals to the dance evaluation data to determine a quality of a dancer's stage presence, charisma and individuality; and calculating a total score for the dance performance based on the assessed scores for technical proficiency, artistic expression, musicality and rhythm, choreography, costume and set design, and individual style; and displaying, by a display device, at least one of the scores for the dance performance.

12. The method of claim 11, wherein the sensors comprise video cameras positioned to acquire three-dimensional video signals of the dance performance and microphones positioned to acquire corresponding audio signals of the dance performance.

13. The method of claim 11, wherein the dance evaluation data comprises a database of dance moves, dance styles and corresponding musical styles.

14. The method of claim 11, further comprising assessing the technical proficiency score based on a comparison of the video frames to the dance evaluation data by determining a quality of each transition from a dance move to a next dance move in the dance performance.

15. The method of claim 11, further comprising assessing the artistic expression score based on a comparison of the video and audio frames to the dance evaluation data by determining how well the dancer conveys emotions, themes, or narratives in the dance performance.

16. The method of claim 11, further comprising assessing the musicality and rhythm score based on a comparison of percussive sounds or vocalizations produced by a dancer to the video signals and the estimated beats and rhythms.

17. The method of claim 11, further comprising assessing at least one of the choreography score or the individual style score based on at least one of: the technical proficiency score, the artistic expression score or the musicality and rhythm score.

18. The method of claim 11, further comprising calculating the total score for the dance performance based on an evaluation score from a dance performance judge.

19. The method of claim 11, wherein the assessed scores are in a range from 0 to 100 and the total score is a weighted linear combination of all of the assessed scores.

20. The method of claim 11, further comprising the one or more processors using artificial intelligence (AI) techniques for assessing the scores for the dance performance.

\* \* \* \* \*